United States Patent
Diemer et al.

(10) Patent No.: US 7,731,849 B2
(45) Date of Patent: *__Jun. 8, 2010__

(54) FILTER MODULE AND FILTER DEVICE

(75) Inventors: Wolfgang Diemer, Waldstetten (DE); Martin Zeiler, Schwaebisch Gmuend (DE)

(73) Assignee: Pall Corporation, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/054,479

(22) Filed: Mar. 25, 2008

(65) Prior Publication Data

US 2008/0190837 A1 Aug. 14, 2008

Related U.S. Application Data

(63) Continuation of application No. 10/469,852, filed as application No. PCT/EP02/01892 on Feb. 22, 2002, now Pat. No. 7,357,866.

(30) Foreign Application Priority Data

Mar. 8, 2001 (DE) ................................ 101 11 064

(51) Int. Cl.
  *B01D 29/11* (2006.01)
  *B01D 27/08* (2006.01)
  *B01D 29/00* (2006.01)

(52) U.S. Cl. .................. 210/347; 210/440; 210/441; 210/455; 210/464; 210/231; 210/232; 210/486; 210/435

(58) Field of Classification Search .................. 210/347
See application file for complete search history.

(56) References Cited

U.S. PATENT DOCUMENTS

| | | | | |
|---|---|---|---|---|
| 3,344,925 A | * | 10/1967 | Graham | 210/312 |
| 3,727,764 A | * | 4/1973 | Ogden | 210/232 |
| 4,361,489 A | | 11/1982 | Kilsdonk et al. | |
| 4,861,466 A | | 8/1989 | Leoncavallo et al. | |
| 5,364,528 A | * | 11/1994 | Schwarz et al. | 210/323.2 |
| 5,569,373 A | | 10/1996 | Smith et al. | |
| 5,830,371 A | | 11/1998 | Smith et al. | |
| 6,284,130 B1 | * | 9/2001 | Daniel | 210/136 |
| 7,357,866 B2 | * | 4/2008 | Diemer et al. | 210/347 |

FOREIGN PATENT DOCUMENTS

JP 62-83511 U 5/1987

OTHER PUBLICATIONS

International Preliminary Examination Report completed Dec. 3, 2002 for International Application No. PCT/EP02/01892.

* cited by examiner

Primary Examiner—Krishnan S Menon
(74) Attorney, Agent, or Firm—Leydig, Voit & Mayer, Ltd.

(57) ABSTRACT

A filter module includes an axially extending central channel, a first hollow adapter having an interior through which the central channel extends, a second hollow adapter having an interior through which the central extends, one or more filter cells positioned between the first and second adapters and around the central channel, and an enclosure. The enclosure has a first retainer ring mounted around the first adapter, a second retainer ring mounted around the second adapter, and an envelope which is sealed to the first and second retainer rings and extends around the one or more filter cells.

20 Claims, 4 Drawing Sheets

FILTER MODULE AND FILTER DEVICE

Figure 1:
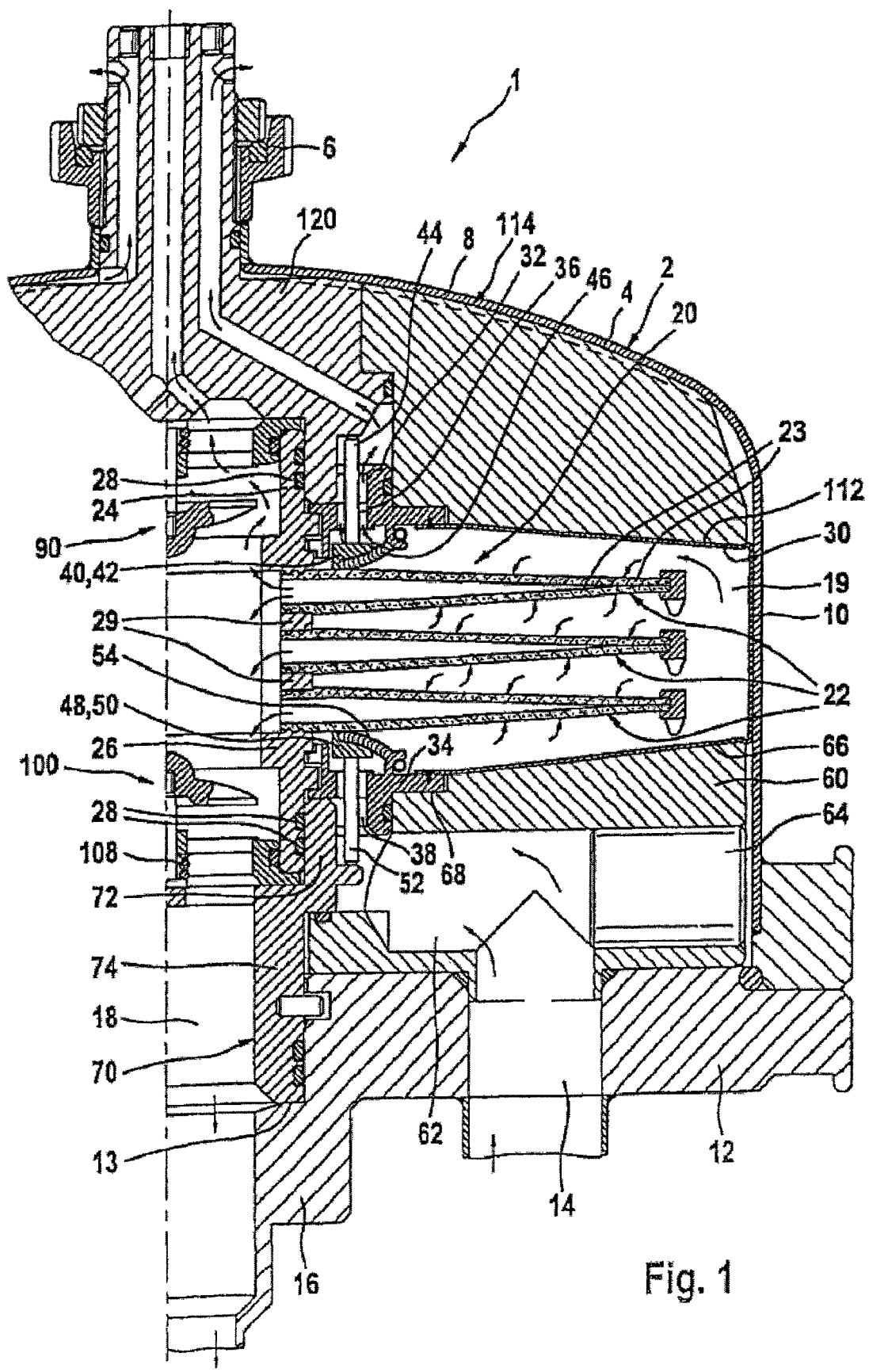

This application, which was published as United States Publication No. U.S. 2008/0190837 A1 is a continuation of U.S. patent application Ser. No. 10/469,852, which issued as U.S. Pat. No. 7,357,866 B2 and is the United States National Phase of International Application No. PCT/EP02/01892, which was filed on Feb. 22, 2002, and claimed priority of German Application No. 101 11 064.2, filed on Mar. 8, 2001, all of which are incorporated by reference.

DESCRIPTION

The invention concerns a module for filtering media. The invention also relates to a filter device with a filter housing in which the filter module or the filter modules is/are installed together with an installation set.

The term filter cells is understood to include all structural types of filter cells, wherein the porous, planar components that can support a flow of a medium are preferably filter layers made of known basic materials, i.e., essentially, cellulose and/or artificial fibers and also diatomite.

Filter devices essentially consist of a reusable filter housing and the associated attachments for filtrate and nonfiltrate material, as well as exchangeable filters, such as filter modules with filter cartridges or filter cells. For conventional filter devices, contact between nonfiltrate material/filtrate and housing is unavoidable, so that the filter housing must be cleaned after use, i.e., after the removal of the used filter. Here, cross contamination from charge to charge cannot be excluded.

Another disadvantage is that contact of the operating personnel with contaminated filter cartridges or filter modules, as well as housing parts, is unavoidable, which is extremely problematic, particularly for toxic or infectious contaminants of the used filter module or for dangerous gaseous materials in the nonfiltrate material chamber.

The parts of the filter housing in contact with the product must be resistant to the nonfiltrate material/filtrate, which in turn makes various housing variants necessary. It is associated with this disadvantage that the filter housing cannot be standardized and adaptation to the appropriate medium is required.

In special application cases, the filter modules must be flushed and sterilized before use. In addition, a drip-free removal of the filter module from the filter housing is just as unlikely as complete residual filtration, which represents a significant disadvantage, particularly for expensive media.

Attempts have already been made to solve these problems by enclosing the filter cartridges or filter modules, but not all of the problems could be solved.

For example, DE 35 20 139 C2 describes a filter device for gases or fluids with a filter cartridge, which is attached to an adapter with two openings for the filtrate and nonfiltrate material. A media-sealed sleeve in the form of a tube is attached to this adapter. This sleeve surrounds the filter cartridge and during filtration contacts the walls of the filter bowl.

However, when the filter is changed, fluid can flow from the space between the supply connection or the outlet connection and the downstream blocking element outwards and onto the cover. This makes additional cleaning work necessary.

A corresponding enclosure of several filter cartridges is explained in DE 38 07 828 C2.

In a refinement of the filter-cartridge enclosure, which is described in DE 38 08 602 C2, the housing and also the supply and discharge connections are modified to prevent these disadvantages. The greatest disadvantage of this device is that when a filtering bag is provided, adaptations to the housing and attachments must also always be provided, so that the so-called standard housing can no longer be used. Retrofitting filter cartridges with filter bags is thus not possible. In addition, increasing amounts of fluid are left behind in the intermediate space between the filtrate and nonfiltrate material. This remaining fluid must be discarded. Corrosive or toxic media hinder the disposal of filter cartridges. This also applies for filter devices based on filter modules with filter cells.

In WO 98/23356, a filter device with a filter module is described. It was considered a disadvantage for conventional filter devices that after the removal of used filter modules, the housing had to be cleaned in order to prevent contamination of subsequent fluids. In addition, residual fluid collects at the outlet of the housing, so that the housing must be opened or removed, which is time- and cost-intensive. Therefore, it was proposed to completely enclose the filter modules, wherein a two-part compression-proof and pressure-sealed enclosure housing is provided, which is removed and disposed of together with the filter module. This enclosure housing is installed freely and without an additional filter housing directly in the supply and discharge pipeline. Thus, the assembly and disassembly of this enclosure housing for the purposes of disposal and for exchanging filter modules with enclosure housings is complicated. Furthermore, residual fluid comes out of the opened connection of the enclosure housing and the supply and discharge pipelines, which is a big disadvantage for corrosive, expensive, and toxic media. This enclosure housing requires a relatively large amount of space, so that either an adaptation of the filter housing or a reduction of the filter modules must be performed. In addition, this pressure-sealed internal housing, which is used only one time, is complicated and expensive in terms of production. Another disadvantage of this so-called single-use housing is that these cannot be produced for filter modules with filter surfaces >1 $m^2$.

Therefore, it is the task of the invention to create an enclosed filter module, and also a filter device which do not have the disadvantages of known filter modules and filter devices. In particular, residual filtration should be possible at a lower cost for the production of filter modules. In addition, contamination of the housing should be essentially prevented and the invention should allow the use of standard modules and standard housings.

This task is accomplished with a module that is characterized in that the enclosure device includes a media-sealed envelope and two retaining rings, the envelope is attached in a media-sealed fashion to the retaining rings, and each retaining ring is arranged on one adapter.

The envelope forms a so-called soft enclosure, which surrounds the filter cell package and seals off the exterior in a media-sealed fashion. The provision of retaining rings enables a simple attachment of the envelope without the adapters having to be changed. Overall, the enclosure device requires no additional space, so that nothing has to be changed to the dimensions of the filter cells and the filter housing. Therefore, standard housings and standard modules can be used, which merely have to be provided with the envelope.

The envelope does protect the housing from contamination, but when the filter module is removed, residue of the medium can still be discharged from the inlet or outlet opening. In order to enable drip-free removal, at least one retaining ring in the inlet or outlet opening may have at least one valve.

By means of the valve or valves in the retaining ring or rings, the inner space of the filter module, i.e., the space located between the filter cells and the envelope and forming the so-called nonfiltrate chamber or the filtrate chamber according to operation, can be filled and/or aerated with the medium, wherein the valves are designed such that they immediately switch to the closed position when the filter module is removed from the filter housing. This effectively prevents leakage of residue of the medium. The attachment of the valves in the retaining ring or rings enables simple production without damaging the envelope.

The envelope preferably consists of a flexible and/or elastic material. According to the purpose of use, corresponding materials are used which are resistant to toxic or corrosive media or are quite safe in terms of food. Preferably, a plastic material is used which belongs to the same class of plastics as the components of the filter module, i.e., the filter cells, spacing rings, etc., so that no material separation has to be performed for the disposal of used filter modules.

To produce the enclosure, preferably a tube film is used, which is pulled over the filter module perpendicular to the longitudinal axis, wherein the retaining rings are already arranged in the correct position at the tube film. Then the open ends of the tube are sealed, preferably fused, in a media-tight fashion.

Conventional filter modules have at the upper end a bowl-shaped adapter and at the lower end a plug adapter, which carries on its outer surface at least one sealing ring, particularly an O-ring. Filter modules with such adapters can be used, wherein according to the configuration of the adapter, the retaining rings have to be adapted. Thus, retrofitting of existing filter modules is possible.

If the enclosure has already been provided for the production of the filter module, it is advantageous if both adapters are the same, because then the same retaining rings can be used at both module ends. This reduces the production costs.

Preferably, plug adapters are used which carry on their outer side at least one sealing element, particularly a sealing ring, preferably an O-ring, because these known adapters already have attachment means for the retaining ring. The retaining rings are preferably set and attached to the adapter like a bayonet.

After filtration, residue of the medium can still be present in the filtrate or nonfiltrate channel, which can drip out when the filter module is removed. To prevent this, valves sealing these channels are arranged at least in the lower adapter and in the lower retaining ring. The valves are preferably configured as plate valves.

In order to be able to install the filter modules according to the invention in existing filter housings, an installation set is provided which has at least one annular base plate and one cover plate. The annular base plate is configured such that it fills up the space between the housing base and the filter module so much that the upper side of the base plate forms a contact surface for the envelope, wherein the base plate has a filtrate or nonfiltrate channel which connects the filtrate or nonfiltrate supply from the housing base to the opening at the lower retaining ring. Furthermore, the base plate has a means for receiving the lower adapter and the lower retaining ring of the filter module. The cover plate is configured so that it fills up the space between the housing cover wall and the filter module so much that the lower side of the cover plate forms a contact surface for the envelope. Furthermore, the cover plate has a means for receiving the upper adapter and the upper retaining ring.

The means for receiving the lower adapter includes a receiver bushing, which is designed such that the receiver provided originally as an adapter receiver fits in the base wall of the filter housing.

The cover plate is preferably formed in two parts and has an annular head plate and a distributor head inserted in the center in the head plate.

The distributor head can have several ventilation channels. Preferably, the distributor head has one ventilation channel for the filtrate channel and/or one ventilation channel for the nonfiltrate chamber, wherein this ventilation channel connects to the ventilation channel located in the upper retaining ring. The ventilation channel for the filtrate or nonfiltrate chamber is important during the first filling of the filtrate or nonfiltrate chamber. Furthermore, the distributor head can have a control channel, which connects to the space located between the envelope and the housing in order to be able to recognize a possible loss of the sealing function in the envelope at an early time.

If two or more filter modules are to be arranged one above the other in the filter housing, the filtrate or nonfiltrate chambers of the filter module must be connected to each other by the valves arranged in the retaining rings. Therefore, it is advantageous if an intermediate plate, which has an opening, is arranged between the filter modules. The intermediate plate is configured such that the space between the filter modules is filled up so much that the two end surfaces each form a contact surface for the envelope of the filter module. Furthermore, this intermediate plate has at least one connection channel, which connects the valve openings of the valves located in the retaining rings of the two filter modules to each other.

The filter device according to the invention has a filter housing in which at least one filter module according to the invention is arranged together with the installation set. The envelope of the filter module or modules is dimensioned such that during the filtration operation it contacts the housing wall of the filter housing and the adjacent components of the installation set. These adjacent components essentially include the base plate, the cover plate, and if necessary the intermediate plate. This guarantees that the envelope does not have to be compression-proof, because the pressure force is received and supported by the components of the installation set or the housing wall.

The control channel can also be used to simplify the filling or emptying of the filter module or modules. For this purpose, the filter device can have a pressure device connected to the control channel. After the completion of the filtration, the envelope can be compressed by applying an overpressure so that residual amounts are pressed out of the nonfiltrate chamber. During filling, a low pressure can be applied so that the envelope contacts the housing wall or the components of the installation set.

In the following, example embodiments are explained in more detail with reference to the figures.

Figure 2:
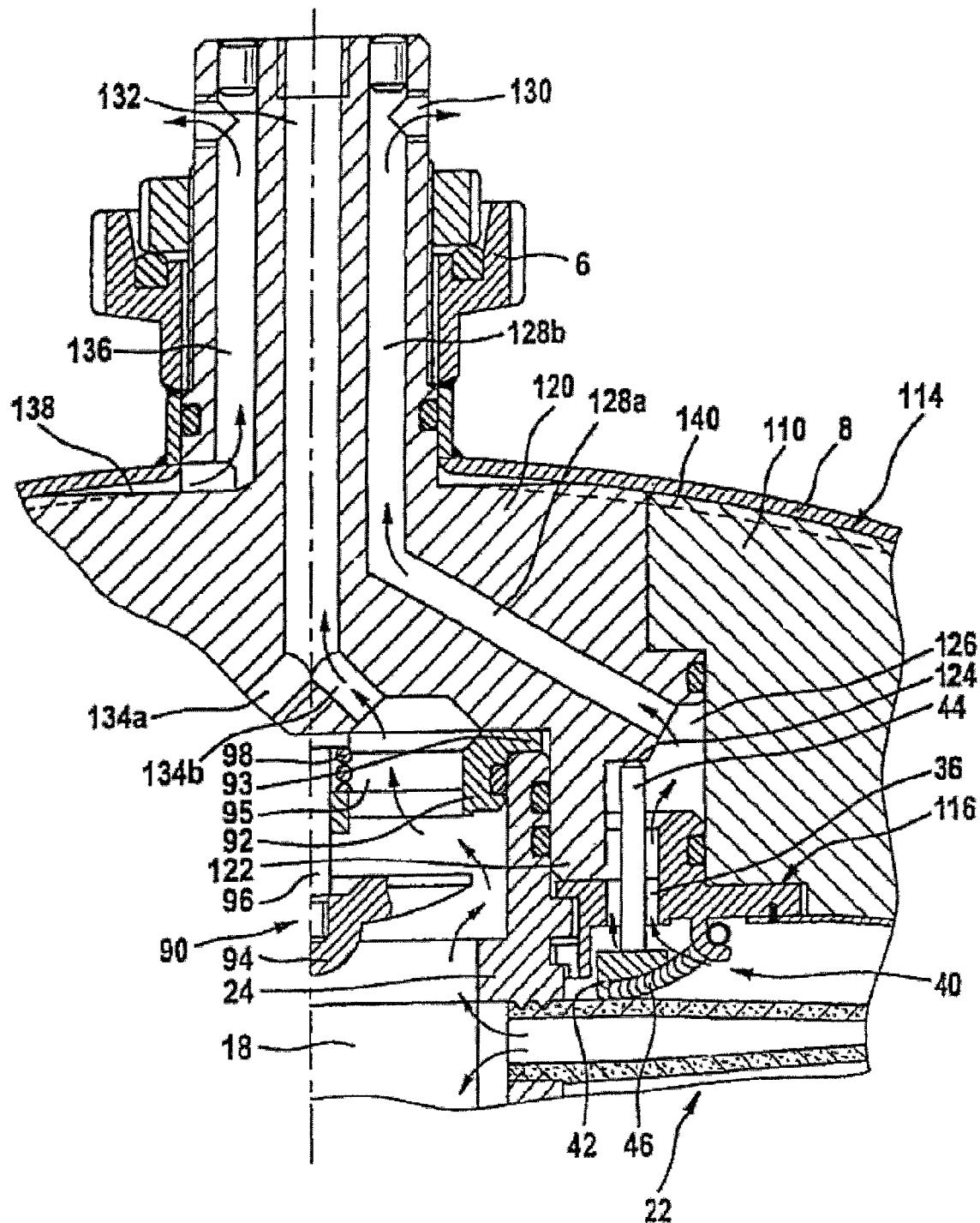
Figure 3:
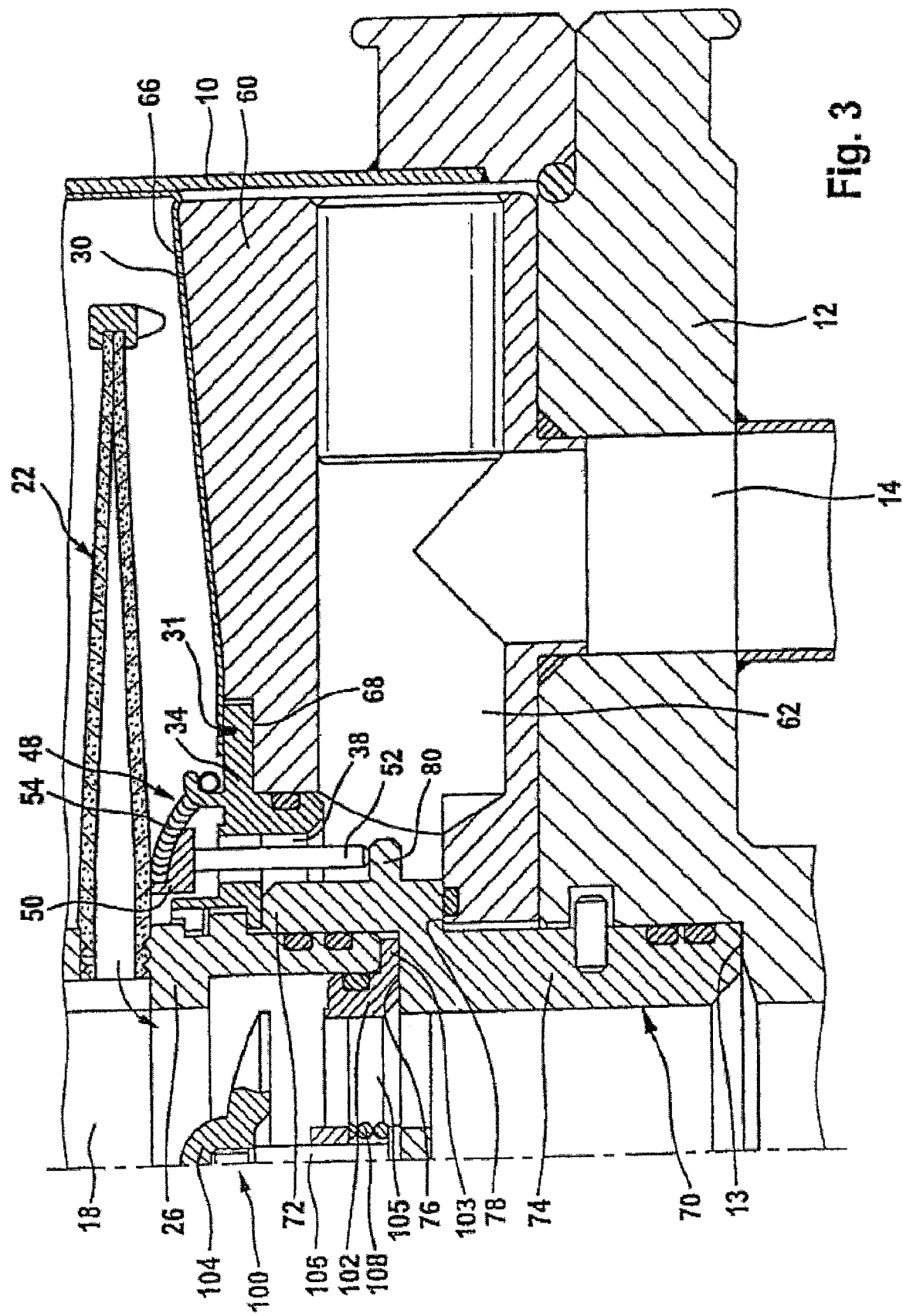
Figure 4:
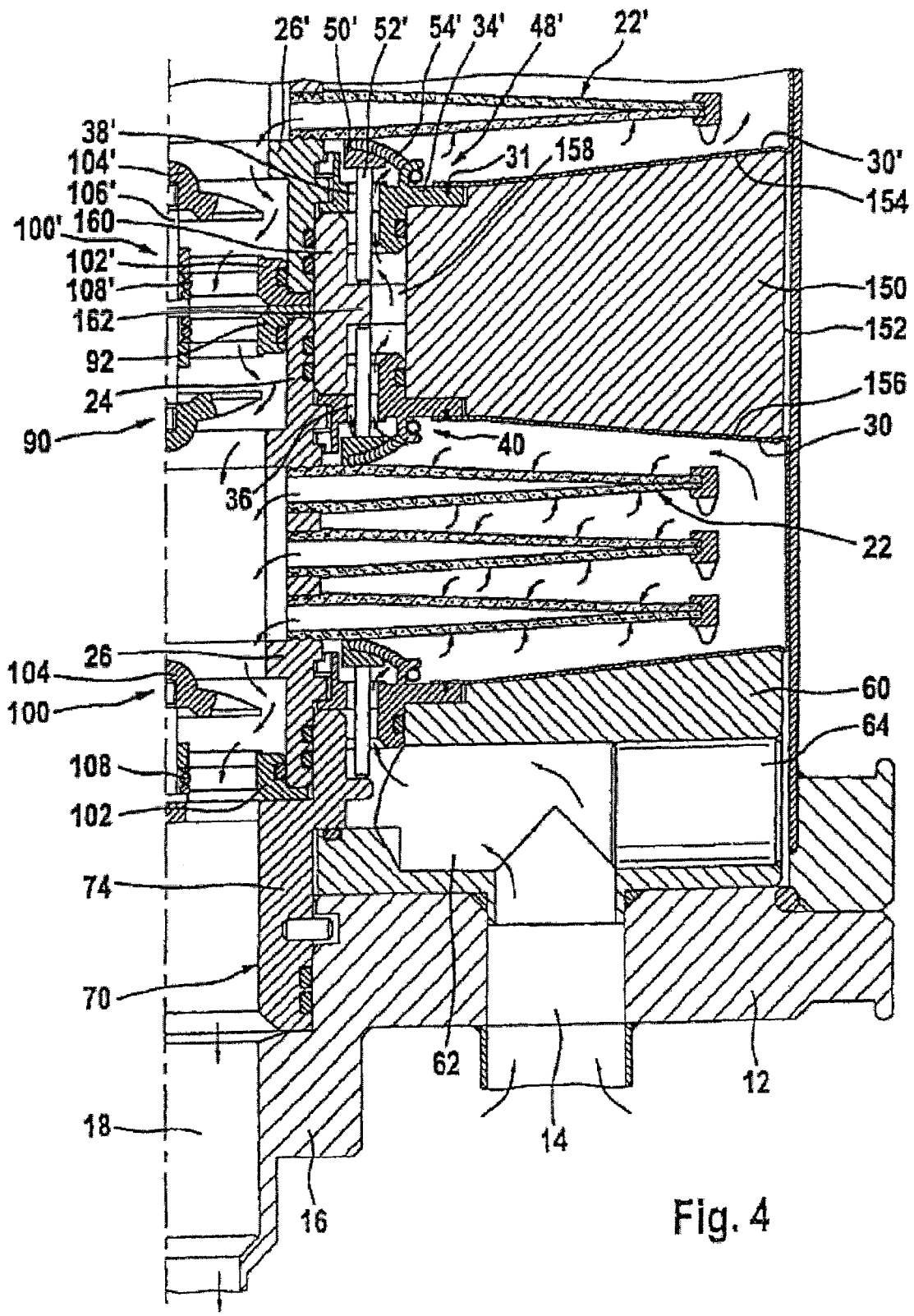

Shown are:

FIG. 1, a vertical partial section of a filter device according to a first embodiment, FIG. 2, an enlarged representation of the upper region of the filter device shown in FIG. 1, FIG. 3, an enlarged representation in the region of the receiver bushing of the filter device shown in FIG. 1, and FIG. 4, a partial section through a filter device according to another embodiment, which features several filter modules.

In FIG. 1, a filter device 1 is shown in vertical partial section. The filter device 1 has a filter housing 2, which consists of a housing upper part 4 and a housing base 12. The housing upper part 4 in turns consists of a housing cover wall 8, at which a housing connection 6 is arranged in the center, i.e., in the region of the center axis of the filter housing, and a housing shell 10 extending downwards to the housing cover wall 8. The housing upper part 4 is formed pressure-sealed and compression-proof and connected to the housing base 12 with a tensioning device that is not shown.

The housing base 12 has a filtrate connection 16 arranged in the center, i.e., in the center axis of the filter device, and an eccentric nonfiltrate supply 14. For reverse operation, the nonfiltrate material is supplied through the connection 16, thus the nonfiltrate connection 16, and discharged through the "supply 14," i.e., the outlet 14. In the following, the module according to the invention is described in connection with the first method of operation.

In the filter housing 2, a filter module is installed with the aid of an installation set, which consists of several components and is described later. The filter module, in the simplified representation shown here, has three filter cells 22, with each filter cell consisting of two disk-shaped filter layers 23, which are connected to each other at the outside periphery. All filter layers 23 have a central opening. These openings together form a filtrate channel 18. Spacing rings 29 are located between the filter cells 22.

At the upper and lower ends of the filtrate channel 18, an upper adapter 24 and a lower adapter 26 attach to the filter cells 22. The two adapters are identical in structure and each carry sealing rings 28 on their outer side. Up to the point that the two adapters are not identical, the construction of this example filter module is known from the state of the art, so that more a detailed explanation is not necessary.

At the upper and lower adapters 24, 26, there are retaining rings 32, 34, which can be set on the projections typically present on adapters of the bayonet seal type. On these retaining rings 32, 34, a soft enclosure in the form of an envelope 30 is attached, which is fused to the retaining rings in the embodiment shown here (fuse seam 31). This envelope 30, which can be, e.g., a film, surrounds the filter cells 22 and is dimensioned so that on one side it contacts the inner side of the housing shell 10 and on the other side it contacts the installation set components 60, 110, and 120, which will be described in detail in connection with FIGS. 2 and 3. Thus, a nonfiltrate chamber 19 is formed between the filter cells and the envelope 30.

Both the upper and also the lower retaining rings 32, 34 each feature at least one valve 40, 48, which are shown enlarged in FIGS. 2 and 3.

The valve 40 acts as a ventilation valve for the nonfiltrate chamber 19 and the lower valve 48 as a supply valve for the nonfiltrate material into the nonfiltrate chamber 19. The valves 40, 48 each have a valve cover 42, 50 with a valve tappet 44, 52. The valve covers 42, 50 are connected to the corresponding retaining ring 32, 34 over a spring 46, 54.

The valve cover 50 of the inlet valve 48 is arranged in the nonfiltrate chamber 19 and seals the valve opening 38 when the filter module is removed from the filter housing 2. In the installed state, the valve tappet 52 contacts a projection 80 (see FIG. 3), so that the inlet valve 48 in the installed state is always located in the open position and thus the inflow of nonfiltrate material into the nonfiltrate chamber 19 is not impaired.

The valve cover 42 is also found in the nonfiltrate chamber 19. In the installed state, the valve 48 is open, so that the air present while the nonfiltrate material flows into the nonfiltrate chamber 19 can escape to the outside through the ventilation channel 128a, b. As soon as the nonfiltrate chamber 19 is filled with nonfiltrate material, a valve, which is arranged on the outlet 130 but is not shown, can then be closed.

Additional adapter valves 90, 100 are arranged in the two adapters 24 and 26.

The upper adapter valve 90 (see FIG. 2) has a valve ring 92, which is inserted in the upper adapter 24 in a sealed fashion.

The valve ring 92 has an annular valve opening 95, which can be sealed by a valve plate 94 with valve tappet 96. The valve plate 94 projects into the filtrate channel 18 and then closes the valve opening 95 when the filter module is removed from the filter housing 2. In the installed state, as illustrated in FIG. 2, the valve tappet 96 contacts the distributor head 120, so that the valve opening 95 is opened.

The adapter valve 100 (see FIG. 3) in the lower adapter 26 is installed correspondingly, with the valve plate 104 likewise projecting into the filtrate channel 18. The valve plate 104 is similarly arranged so that it closes the valve opening 105 when the filter module is removed from the filter housing 2. The valves 90, 100, 40, and 48 thus enable drip-free removal of the filter module.

To enable the installation of the filter module in a conventional filter housing, an installation set is provided, which is described in more detail in connection with FIGS. 2 and 3.

In FIG. 2, the upper components of the installation set are shown. The cover plate consists of an annular head plate 110, whose outer contours, as shown in FIG. 1, are adapted to the inner contours of the housing cover wall 8 and the housing shell 10. The lower side 112 of the head plate 110 forms a contact surface for the envelope 30. Here, it is important that only a small distance is maintained to the housing shell 10 so that during the filtration the noncompression-proof envelope 30 cannot bulge out so far that it is damaged. Furthermore, the head plate 110 has a ring receiver 116 for the upper retaining ring 32.

Furthermore, a distributor head 120 is inserted in the center in the head plate 110. This distributor head extends upwards through the housing connection 6. In the distributor head 120, as can be seen in FIG. 2, there is a ventilation channel 128a, 128b, which connects to the valve opening 36 of the valve 40 over the annular chamber 126. Therefore, the air escaping from the nonfiltrate chamber can be discharged through the outlet 130 at the upper end of the distributor head 120. In the region of the annular chamber 126, a stop 124 is formed on the distributor head 120 for the valve tappet 44, which holds the valve 40 in the open position in the installed state. The distributor head 120 further has an annular flange 122 for receiving the upper adapter 24.

In the center in the distributor head 120, there is a ventilation channel 132 with the channel branches 134a and b, which connect to the filtrate channel 18.

Furthermore, located in the distributor head 120 is a control channel 136, which connects over the channel branches 138 and 140 to the intermediate spaces between the head plate 110 and the housing upper part 4 and thus also to the intermediate space between the envelope 30 and the housing shell 10. If the envelope 30 is damaged, the nonfiltrate material would flow outwards through the channel branches 138, 140 and the control channel 136 and thus could be detected.

However, the control channel 136 can also be attached to a pressure device. If the pressure device is an overpressure device, e.g., compressed air can be blown into the channels 138, 140 so that the envelope is pressed against the filter cells 22. This enables residual filtration to be performed at the end of filtration.

The control channel 136 can also be attached to a low-pressure device, so that the filling process at the beginning of filtration can be supported by suction in the envelope 30 up to the attachment to the housing wall.

As can be seen in FIG. 3, an annular base plate 60 is arranged between the base plate 12 and the filter module. The radial dimension of this base plate essentially corresponds to the inner dimension of the housing shell 10. The base plate 60 has a surface 66, which rises towards the outside in the radial direction and which forms a contact surface for the envelope 30. Because the envelope 30 is not pressure-sealed, it is important that the base plate 60 extends as close as possible to the inner side of the housing shell 10, so that the envelope 30 is not damaged in the transition region between the base plate and the housing shell by the inner pressure in the filter module.

The base plate 60 has a nonfiltrate channel 62 which connects the nonfiltrate supply 14 of the base wall 12 to the valve opening 38 of the valve 48. The annular base plate 60 has a ring receiver for receiving the retaining ring 34 and carries a receiver bushing 70 arranged in the center for receiving the lower adapter 26. The receiver bushing 70 has a lower bushing section 74 and an upper bushing section 72 that widens outwards in the radial direction for receiving the adapter 26. An inner shoulder 76 and an outer shoulder 78 are formed by the radial offset. With the outer shoulder 78, the receiver bushing 70 contacts a corresponding surface of the base plate 60. The inner shoulder 76 is used to support the valve ring 102 of the adapter valve 100. A projection 80 as a stop for the valve tappet 52 of the inlet valve 48 is arranged radially outwards on the upper bushing section 72. The position of the projection 80 is selected so that the valve tappet 52 presses the valve cover 50 upwards, so that the valve opening 38 is opened.

In FIG. 4, another embodiment is shown which concerns the installation of two schematically illustrated filter modules. In order to be able to connect the two filter modules to each other, an intermediate plate 150 is provided with end surfaces 154, 156 as contact surfaces for the envelopes 30, 30'. The annular intermediate plate 150 receives the lower retaining ring 34' of the upper filter module and the upper retaining ring 32 of the lower filter module. The intermediate plate 150 extends with its outer peripheral surface 152 into the vicinity of the inner surface of the housing shell 10. Furthermore, the intermediate plate 150 has a ring element 160 for receiving the adapter 26' and 24. The valves 40 and 48' are connected to each other over a connection channel 158. A projection 162 of the ring element 160 projects into this connection channel and this projection acts as a stop for the valve tappet 52' and 44.

The invention claimed is:

1. A module for filtering media comprising:
an axially extending central channel;
a first hollow adapter positioned at a first end of the central channel and having an interior through which the central channel extends and an exterior;
a second hollow adapter positioned at a second end of the central channel and having an interior through which the central channel extends and an exterior;
one or more filter cells positioned between the first and second adapters and around the central channel, wherein each filter cell includes first and second filter layers and wherein each filter layer has an inner surface and an outer surface, the first and second layers defining a passage that fluidly communicates between the inner surfaces of the filter layers and the central channel; and
an enclosure including a first retainer ring, a second retainer ring, an envelope, and an exterior, wherein the first retainer ring is mounted around the exterior of the first adapter at the first end of the central channel, wherein the second retainer ring is mounted around the exterior of the second adapter at the second end of the central channel, wherein the envelope extends around the one or more filter cells and includes a first region sealed to the first retainer ring and a second region sealed to the second retainer ring, the envelope and the filter cells forming a fluid chamber, and wherein the enclosure further has an opening that fluidly communicates between the exterior of the enclosure and the second surfaces of the filter layers of the one or more filter cells in the fluid chamber.

2. The filter module of claim 1 wherein the one or more filter cells comprise a plurality of filter cells stacked on one another between the first and second adapters and around the central channel.

3. The module of claim 1 wherein the envelope comprises a flexible and/or elastic material.

4. The module of claim 1 wherein the first and second hollow adapters are identical.

5. The module of claim 1 wherein the opening is positioned in one of the retainer rings.

6. The module of claim 1 wherein the opening comprises a first opening and the enclosure further has a second opening that fluidly communicates between the exterior of the enclosure and the second surfaces of the filter layers of the one or more filter cells, the first opening being positioned in the first retainer ring and the second opening being positioned in the second retainer ring.

7. The module of claim 1 wherein one of the adapters includes a valve arranged to close the central channel.

8. The module of claim 7 wherein the adapter valve is a plate valve.

9. A filter device comprising a housing and a filter module of claim 1 disposed in the housing, the housing having a media inlet fluidly communicating with the central channel and a filtrate outlet fluidly communicating with the opening in the enclosure.

10. The filter device of claim 9 wherein the housing has an interior and wherein the exterior of the envelope contacts the interior of the housing.

11. A filter device comprising a housing and a filter module of claim 1 disposed in the housing, the housing having a media inlet fluidly communicating with the opening in the enclosure and a filtrate outlet fluidly communicating with the central channel.

12. The filter device of claim 11 wherein the housing has an interior and wherein the exterior of the envelope contacts the interior of the housing.

13. The module of claim 1 wherein the first hollow adapter is positioned at one end of the module and the first retainer ring is arranged on the first hollow adapter at the end of the module, wherein the second hollow adapter is positioned at an opposite end of the module and the second retainer ring is arranged on the second hollow adapter at the opposite end of the module, and wherein the first and second hollow adapters are identical.

14. A module for filtering media comprising:
a first hollow adapter at one end of the module, the first hollow adapter having an interior and an exterior;
one or more filter cells, each filter cell including first and second filter layers having an inner surface, an outer surface, and a central opening;
a second hollow adapter at an opposite end of the module, the second hollow adapter having an interior and an exterior;
an axially extending central channel, wherein the central channel extends axially through the interior of the first hollow adapter at the first end of the module, the central openings of the one or more filter cells, and the interior of the second hollow adapter at the second end of the module, respectively, wherein the one or more filter cells is located axially between the first hollow adapter at the first end of the module and the second hollow adapter at the second end of the module, and wherein the first and second filter layers of each filter cell define a passage that fluidly communicates between the inner surfaces of the filter layers and the central channel; and an enclosure including an envelope that surrounds the one or more filter cells, a first retainer ring sealed to the envelope and arranged on the exterior of the first hollow adapter at the first end of the module, and a second retainer ring sealed to the envelope and arranged on the exterior of the second hollow adapter at the second end of the module, wherein the enclosure has an exterior and defines a chamber between the second surfaces of the filter layers and the envelope, and wherein the enclosure further has an opening that fluidly communicates between the exterior of the enclosure and the chamber.

15. The module of claim 14 wherein the first and second hollow adapters are identical.

16. The module of claim 15 wherein the envelope comprises a flexible and/or elastic material.

17. The module of claim 16 wherein the opening in the enclosure is positioned in one of the first and second retainer rings.

18. The module of claim 14 wherein the first retainer ring is mounted around the first adapter at the first end of the channel and the first adapter extends through the first retainer ring to the exterior of the enclosure and wherein the second retainer ring is mounted around the second adapter at the second end of the channel and the second adapter extends through the second retainer ring to the exterior of the enclosure.

19. The module of claim 18 further comprising a first valve arranged with the first adapter to open and close the channel at the first end, a second valve arranged with the second adapter to open and close the channel at the second end, and a third valve arranged with the enclosure to open and close the opening in the enclosure.

20. The module of claim 19 wherein the opening in the enclosure is positioned in one of the first and second retainer rings and wherein the first and second adapters are identical.

* * * * *